Patented Apr. 14, 1931

1,801,053

UNITED STATES PATENT OFFICE

JOSEPH V. MEIGS, OF BOSTON, MASSACHUSETTS, ASSIGNOR TO MEIGSOID CORPORATION, OF JERSEY CITY, NEW JERSEY, A CORPORATION OF NEW JERSEY

CARBOHYDRATE PRODUCT AND PROCESS OF MAKING SAME

No Drawing.   Application filed January 22, 1925.   Serial No. 4,117.

The present invention is related to my co-pending applications, Serial Numbers 517,721, 575,648, and 617,399, and, like them, deals with the production of materials of a resinous, plastic or rubbery nature and adapted for use in industries relating to the production of molded articles, varnishes and the like, as for example, molded electrical insulation, phonograph records, etc., all as will be more fully hereinafter described and as claimed.

In its broader aspects, the present invention deals with processes and products involving reactions between carbohydrates and nitrogenous or basic material, in the presence or absence of acids or acidic material. The term carbohydrate is a broad term and includes the polysaccharides, or polyoses, such as cellulose in its various forms, the several varieties of starches and dextrines, the pentosans and pentosan-bearing materials such as oat hulls, bran, straw and the like, the disaccharides, as for example, sucrose, maltose and lactose, and the monosaccharides, as for example, levulose, glucose or dextrose, etc., as well as the pentoses, as for example, xylose. The invention is not, therefore, limited to any particular carbohydrate or mixture of carbohydrates and may employ any suitable member of the carbohydrate family as may be found advantageous under the circumstances.

As is well known, the polysaccharides or more complex carbohydrates, upon treatment with acidic material undergo degradation or hydrolysis into simpler products, as for example, the monosaccharides, particularly dextrose. For example, starch upon treatment with hydrochloric acid may be resolved first into dextrines, the latter then undergoing further hydrolysis in such a manner that dextrose may be the chief final product. Similarly, many of the celluloses and pseudo- or hemi-celluloses may be resolved by hydrolysis into simpler or monosaccharides by treatment with acidic material. The pentosans frequently found admixed with cellulose, on treatment with acidic material may be resolved into pentose sugars, as for example, xylose.

The more easily available carbohydrate materials, as for example, the commercial sugars, dextrines, starches and celluloses, on hydrolysis with acidic material yield dextrose in large proportion. For example, commercial corn starch may be almost quantitatively hydrolyzed into dextrose. The result of such a process is the commercial material known as corn sugar and the carbohydrate content of such material may be largely or wholly dextrose. Cane and beet sugar on the other hand yield on hydrolysis equal parts of dextrose and levulose and the result of such a process, or inversion, is the commercial material known as invert sugar. Dextrose represents at the present time the most important hexose sugar and, as a sugar, ranks with sucrose in importance. As is well known, cellulose also yields dextrose on appropriate treatment with acids.

Dextrose in many of its reactions, as for example, in reactions involved in the present invention, may be substituted by other carbohydrate material, as for example, those varieties which in the presence of acidic material will yield dextrose as a result of hydrolysis. Among such dextrose-yielding material the dextrines, starches and celluloses may be mentioned. The use of carbohydrates in the present invention further extends to the employment of all dextrose- and other monose-yielding materials. This includes materials of a by-product or intermediate character, as for example, molasses, corn syrup, cane and beet sugar syrups, etc.

The product of the reaction between a carbohydrate and a suitable nitrogenous or basic body may lead to the production of substances of a resinous character suitable for use in the manufacture of varnishes, or for use as binding material for fibrous or non-fibrous ingredients in the manufacture of hot or cold molded articles.

So-called hot molded articles are distinguished from the cold molded variety in that the former are hardened by heating, or "curing", in a mold or otherwise, whereas the latter acquire their hardness through cooling.

The acidic material employed in the present invention embraces a wide variety of substances having an acid character, and the product of the reaction between a carbohydrate, a reactive basic substance and an acid or acidic material, leads, therefore, to products varying widely in their properties, depending to a large extent upon the character of the acidic material employed as well as upon the ratio of the same to the basic or nitrogenous and carbohydrate constituents. The invention is not, however, limited to any particular class or group of acids or acidic material, although in the preferred form of the present invention the type of acidic material employed is phenolic in character. The phenols are well recognized to have weak acidic properties, that is, they form salts with bases and contain hydrogen which may be replaced by a metallic substance. They come within the meaning of the term "acidic body" employed in the present specifications and claims and their acidic properties are sufficiently strong to effect, or take part in, the reactions involved in the present invention. In general, the stronger the acid properties of the acidic substance employed, the more vigorous may be its reaction with the carbohydrate and reactive basic body. For example, with a strong acid such as hydrochloric acid, the proportion of the same with respect to the carbohydrate and reactive basic body should preferably be small, inasmuch as very considerable concentrations of such a strong acid would tend to lead to carbonization of the carbohydrate. On the other hand, the concentration of weak acids, as for example, boric acid, stearic acid, oleic acid, benzoic acid, phenols, tannic acid and other weak acids, may be very considerable, without causing carbonization of the carbohydrate in the presence of a suitable reactive basic or nitrogenous body. It would seem that the hydrogen ion concentration of the acid influences the reaction to a very large extent, that where this concentration is very low, as for example, in the case of the phenols, boric acid and other very weak acids, the concentration of the latter may be very considerable, whereas with the stronger acids whose hydrogen ion concentrations are very high, the proportion of the same that may be employed is proportionately less.

For example, if dextrose is reacted with a reactive basic body, as for example aniline, in the presence of hydrochloric acid, the concentration of the hydrochloric acid should preferably be very low and that of the aniline may be considerable. The result of such a reaction is, under suitable conditions, a body of a resinous character, its consistency depending on the proportion of aniline to dextrose and also on the proportion of hydrochloric acid employed. Such a body will in general have a resinous character, although, as stated, its hardness or softness will depend upon the proportions of reacting ingredients.

It has been found that carbohydrates are very sensitive to the action of acids in the presence of a suitable or reactive basic material and although the explanation of this matter has not been fully determined, it is thought that the basic material, particularly in the presence of dextrose and dextrose-yielding materials, causes the dextrose to be transformed into an active isomer (possibly levulose or gamma-dextrose) which may then react with the acid body, or reactive basic material, or both. The function of the acidic material is probably to cause the carbohydrate, as for example, dextrose or its active isomer, to be transformed into substances perhaps of a cyclic character, possibly furane derivatives, as for example, hydroxymethyl furfural, which products may react with themselves by polymerization or otherwise (particularly in the presence of acidic material) or may combine with the acidic material; or such products, or their polymers or condensation products, may remain dissolved in the acidic material, where the acidic material has suitable solvent power.

The reaction between the carbohydrate, the acidic material and suitable basic body can be carried out by bringing these materials into intimate contact in various ways, as for example, by mutual solvent action, or by the action of a common solvent or by otherwise intimately commingling the ingredients, as well as by the application of energy, e. g., heat, all as is well known to those skilled in the art of carrying out chemical reactions.

It will be apparent from the above that the reaction between a carbohydrate, a reactive basic body and an acid may in its general aspects be not so much a combination of the carbohydrate, as such, with the acid as it may be a hydrolysis of the carbohydrate or partial decomposition of the same by means of the acid and reactive basic material, and the appended examples will serve to indicate the generality of acidic material that may be employed and the effect of the nature of the same upon the character of the resulting products:

*Examples*

1. Dextrose, aniline and stearic acid:

| | Parts by weight |
|---|---|
| Corn sugar (85% dextrose) | 105 |
| Aniline | 50 |
| Stearic acid | 125 |

Upon heating the mixture of the above materials, they blended together into homogeneous solution which was heated three hours under reflux. Water was evolved which was later removed by evaporation. The resulting reaction product was a dark red, readily fusible, waxy solid with a low melting point.

2. Dextrose, aniline and boric acid:

|  | Parts by weight |
|---|---|
| Corn sugar (85% dextrose) | 105 |
| Aniline | 50 |
| Boric acid | 10 |

These materials were heated under reflux for one hour. The result was a dark red, low melting point, fusible, resinous body, brittle when cold.

The acid and the reactive basic body can be combined before reaction with the carbohydrate in the form of a salt, as for example, an ammonium salt, as shown by the following example:

3. Dextrose, ammonia and citric acid (ammonium citrate):

|  | Parts by weight |
|---|---|
| Corn sugar (85% dextrose) | 180 |
| Ammonium citrate | 120 |
| Water | 100 |

In this case water is employed as a common solvent. These ingredients were heated under reflux for three-fourths of an hour. A large yield of water-insoluble, black, resilient material was obtained, having a consistency resembling that of a concentrated rubber solution.

4. Dextrose, aniline and abietic acid:

|  | Parts by weight |
|---|---|
| Corn sugar | 180 |
| Abietic acid (rosin or colophony) | 60 |
| Aniline | 20 |
| Water | 60 |

The above ingredients were heated under reflux about five hours. There was obtained a resinous, water-insoluble mass, smelling like rosin but unlike rosin becoming infusible upon melting and continued heating.

5. Dextrose, aniline and oxalic acid:

|  | Parts by weight |
|---|---|
| Corn sugar | 400 |
| Aniline | 200 |
| Water | 200 |
| Oxalic acid crystals | 6 |

The above ingredients were heated under reflux for three hours and yielded a viscous, resinous mass which was washed with water and dehydrated by heating to 110 degrees centigrade. Above this temperature polymerization and consequent hardening set in. The hardening of this material is accelerated by the presence of citric acid as well as by the action of hexamethylenetetramine. The product also reacts vigorously with oxidizing agents, as for example, potassium bichromate, and is hardened thereby.

A product prepared as in Example 5 has the property of dissolving casein. 200 parts by weight of a product prepared as described above were heated to 70 degrees centigrade and mixed with a solution of 60 parts by weight casein in 20 parts by weight of water and 9 parts by weight strong ammonia. The resulting product was dehydrated at 110 degrees C. 200 parts by weight of it were mixed with 50 parts by weight of wood flour and 20 parts by weight of magnesia, on rubber mixing rolls. The resulting mixture was cured for 10 minutes in a mold at 20 lbs. steam pressure and under a compression of 2000 lbs. per square inch. The resulting molded article was hard and tough, and black in color.

6. Dextrose, aniline and hydrochloric acid:

|  | Parts by weight |
|---|---|
| Corn sugar | 400 |
| Aniline | 200 |
| Water | 200 |
| Concentrated hydrochloric acid | 3 |

These ingredients were heated under reflux for three hours and yielded a dark red, viscous, resinous mass which was washed with water and dehydrated by heating to 130 degrees centigrade. The product, on cooling, was a brittle, dark red resin.

7. Dextrose, ammonia, chromic acid and phenol (chromic acid and ammonia used in the form of ammonium chromate):

|  | Parts by weight |
|---|---|
| Corn sugar (85% dextrose) | 180 |
| Ammonium chromate | 15 |
| Phenol | 85 |
| Water | 100 |

These materials were heated under reflux for eight hours, and the products, upon settling, separated into two layers. The upper layer was a dark colored, water-insoluble, viscous liquid, which on heating to 150 degrees centigrade underwent transformation and, on cooling, yielded a solid, fusible, resinous product.

8. Dextrose and para aminophenol. (Here the basic and acid bodies are joined in one and the same substance, viz., para aminophenol):

|  | Parts by weight |
|---|---|
| Corn sugar | 210 |
| Para aminophenol | 135 |
| 50% acetic acid | 50 |
| Water | 40 |

These ingredients were refluxed for three hours. The product was dehydrated by distilling off the water. The residue was a black, fusible, solid resinous mass.

9. Sucrose, ammonia and hydrochloric acid (ammonium chloride), phenol, water:

| | Parts by weight |
|---|---|
| Sucrose | 300 |
| Ammonium chloride | 50 |
| Phenol | 100 |
| Water | 80 |

The above materials were refluxed for one hour whereupon a heavy deposit of elastic, black, water-insoluble, plastic material was obtained.

As previously stated, products of the present invention may be used in the manufacture of molded articles, as for example, in the manufacture of the so-called hot molded products. For such purposes the products of the present invention may conveniently be handled in two forms, corresponding to two stages of the reaction involved. In the first stage, the product can be prepared in a fusible and soluble and comparatively soft condition and can be readily mixed or incorporated with other materials in a manner well known to those skilled in the art. Such other materials may comprise: cellulosic and other fibers or fibrous material, as for example, wood pulp, ground wood, cotton linters, cotton, wool or silk "flock"; rubber, rubber substitutes, glue, casein, gluten, starch, asphalt, coal tar, wood tar, stearin, and other fats and oils, beeswax and other waxes, rosin, copal and other resins, gutta-percha and similar plastics, gum arabic and other so-called gums, as well as inorganic materials, as for example, metallic oxides, hydroxides and salts and other suitable material, as for example, zinc oxide, lead oxide, aluminum oxide, aluminum hydroxide, calcium sulphate, silicon carbide, carbon black or lamp black, aluminum silicate, rotten stone, asbestos, talc, sulphur, phosphorus, diatomaceous earth.

In the relatively workable, or soluble and fusible condition hereinabove mentioned, the products of the present invention can be mixed or treated, furthermore, with agents designed to cause polymerization, condensation or hardening, particularly under the influence of heat, or heat and pressure, such conditions being commonly imposed by placing the material in question in a mold and subjecting the later to presure and heat, in a manner well known to those skilled in the molding art.

As a result of such treatment, the relatively soft material referred to hereinabove may then be changed into a harder form, this process comprising a second or subsequent stage in the practise of the invention.

The hardening or condensing agents hereinabove referred to comprise bodies of an acid or basic character, or suitable derivatives thereof, or substances yielding the same, as well as aldehydes or suitable derivatives thereof, as for example: oxalic acid, aniline oxalate, ferric chloride, thiocarbanilide, benzyl chloride, lead dioxide, calcium hypochlorite, aniline, toluidines, hexamethylenetetramine, paraphenylenediamine, furfural, furfuramide, salicylic acid, potassium tetraoxalate, trichloracetic acid, paraformaldehyde, paraldehyde, as well as metallic oxides, as for example, magnesium oxide, zinc oxide, oxides of manganese, etc.

To recapitulate, the invention in its broad form comprises the preparation of resinous or allied material by reactions between a carbohydrate, a suitable acid, or substance having an acidic character, and a reactive basic, alkaline or nitrogenous substance. Such reaction can be carried out in one stage, leading to the production of a resinous or similar substance capable of direct utilization, as for example, in the manner commonly employed in the utilization of shellac. Or the reaction can be carried out in two or more stages, the first stage leading to the production of a comparatively soft, resinous substance or body capable of further hardening by means of heat or other suitable treatment. At this point the reaction can be stopped or allowed to come to equilibrium or held in abeyance, as for example, by discontinuing the heating of the reaction, or by so proportioning the ingredients that the reaction stops of its own accord or comes to equilibrium, and nevertheless yields a product capable of further subsequent reaction. Such a product may then be termed a "potentially reactive resin" or similar body. That is, while it is in a comparatively soft and workable condition, it can be mixed with other ingredients and treated with hardening agents and converted by heat and pressure, or otherwise, into technically useful articles, as for example, articles intended for electrical and heat insulation, or other purposes.

As regards the reactive basic body, hereinabove mentioned as taking part in or causing the reaction between the carbohydrates and suitable acid, such suitable or reactive basic body can be employed in one or more of the stages of the reaction and may comprise any suitable or reactive basic substance or suitable derivative thereof, or substance containing, comprising or yielding such reactive basic body, as for example, aniline and its homologues and suitable derivatives, naphthylamines, ammonium chloride, ammonium chromate, paraphenylenediamine, thiocarbanilide, ammonium citrate, hydroxylamine, sodium hydroxide, potassium cyanide, para-aminophenol, urea. As hereinbefore stated, the function of the acidic material employed in the present invention is one which may bring about, in the presence of the reactive basic or nitrogenous substance, decomposition or other transformation of the carbohydrate. Such a decomposition or transformation is apparently caused by that which is common to all substances having an acid character, or what is commonly called a reactive hydrogen atom. Owing to the immense number of compounds known as acids and the great diversity of their character (other than the possession of a reactive hydrogen atom), not all acids may be employed in the same concentration. In general, the weaker the acid character of the acid body, the larger may be the amount or proportion of the same employed with respect to the carbohydrate and reactive basic body. On the other hand, in the presence of a strong basic body the proportion of strong acid employed may be greater than would otherwise be the case, owing to the neutralization, in whole or in part, of such acid by the basic body.

The character and concentration of the acid employed may influence the nature of the resulting product substantially, for example, if stearic acid is reacted with dextrose and aniline, the resulting substance, under suitable conditions, possesses a waxy character; if rosin (containing abietic acid) is employed, the resulting substance may have a decided resinous character resembling rosin somewhat in its appearance. A considerable proportion of citric acid in conjunction with dextrose or other carbohydrate and a reactive basic body, as for example, aniline, yields under certain conditions a black, resilient product resembling a very concentrated rubber solution. Other hydroxy and poly-basic acids may act similarly, as for example, salicylic acid, phthalic acid, lactic acid. The concentration of the stronger mineral acids, such as sulphuric, hydrochloric, phosphoric, chromic acid and the like, should preferably be small with respect to the carbohydrate. For example, 500 parts by weight of dextrose may be reacted with 250 parts by weight of aniline and from 1 to 5 parts of hydrochloric acid, in the presence, if desired, of sufficient water to moderate the reaction. Such a mixture, heated under reflux for several hours and washed with water, yields a product which upon subsequent heating with or without hardening agents or other bodies yields a product of a useful, resinous character.

When employing the weaker mineral acids, as above described, as for example, stannic acid, vanadic acid and other acids corresponding to the oxides of non-metallic or amphoteric elements, (as for example, oxides of molybdenum, bismuth, antimony, manganese, lead, and tin), the proportion or concentration of the same can safely be much larger than that of the stronger mineral acids. Although it is probable that not all of such acidic material takes part in the reaction between carbohydrate and reactive basic body, nevertheless, the excess of such material may be allowed to remain in the reaction mixture as a supporting or filling material.

Furthermore, in the reaction between the carbohydrate, a reactive basic body and acidic material, considerable amounts of water may be evolved during the reaction. This may be accounted for by the dehydration of the carbohydrate or sugar molecule, as well as by the presence of water, existing as such, or in the form of water of crystallization. Such water may be utilized as a diluent and may be allowed to remain during the course of the reaction, as for example, where the latter is carried out by digesting the reacting bodies under reflux. Such water may on the other hand be continuously removed during the reaction, as for example, by subjecting the reacting bodies to distillation. Before utilizing the products of the present invention as resinous or similar bodies for use in the molding or other arts, it is generally desirable to remove from such bodies as much water as possible, as for example, by distilling the same, or subjecting them to a drying process in air or in vacuo, or by heating said bodies and blowing a current of air or other suitable gas through the same.

Furthermore, the products of the present invention can, during the process of their manufacture, or subsequent thereto, be treated with oxidizing or reducing agents, as for example, air, oxygen, hydrogen peroxide, potassium dichromate, potassium permanganate, potassium ferricyanide, ozone, ultra-violet light, sulphur, chlorine, hypochlorites, etc., and, as regards reducing agents, sulphur dioxide, zinc dust and alcohol, and other suitable reducing agents. The tendency of oxidizing agents is toward hardening of the products of the invention whereas reducing agents, under suitable conditions, effect a bleaching action. Many of the products of the present invention are dark colored. The colors may be black, deep blue, or deep red. The lighter colors, as for example, brown, may be produced by the action of suitable reducing agents, as for example, zinc dust and alcohol.

In the preferred form of the present invention the type of acidic material employed is phenolic in character. Whether such phenolic material is conventionally classed under the acids or not, is without influence on the present specifications and claims, inasmuch as for the purposes of the invention the phenols come distinctly within the meaning of the term acidic material. This is in accordance with standard treatises on organic chemistry in which the acid nature of the phenols is emphasized.

The present invention may employ any desirable phenolic substance or suitable derivative thereof capable of reacting with a carbohydrate and a reactive basic body to form a substance of a resinous or allied character. The phenols may be employed singly or in groups, that is, one or more phenol may be simultaneously employed. Among the phenolic substances that may be utilized are: ordinary phenol, or carbolic acid, and its homologues, the cresols, xylenols, etc., or commercial mixtures containing such bodies, as for example, coal tar creosote, cresylic acid, and the like; the naphthols and their homologues, and other monohydric phenols; dihydric phenols, as for example, resorcin, hydroquinone, orcin, catechol; polyhydric phenols, as for example, pyrogallic acid (or pyrogallol), phloroglucinol; guaiacol, creosol and commercial mixtures containing the same, as for example, wood tar creosote.

The type of phenolic material to be selected depends largely upon the type of resinous product desired. As is well known, synthetic resinous substances may be divided into, first, those which become infusible by the application of heat or otherwise, and secondly, those which remain fusible. Ordinary phenol or carbolic acid may be employed in the present invention in the preparation of products which become infusible. Other phenolic substances may, on the other hand, be reacted with a carbohydrate and a reactive basic body to produce resinous substances, the ability of which to become infusible may be not so great. Mixtures of phenolic bodies can be employed, as for example, phenol and beta-naphthol, phenol and cresols, phenol and guaiacol, phenol and wood creosote, beta-naphthol and cresols, beta-naphthol and wood creosote, alpha-naphthol and phenol, pyrogallol and phenol, etc.

In carrying out the reaction between a carbohydrate, a reactive basic body and a phenol, an excess of carbohydrate material over that which will combine with the phenolic body, can be used and such excess later removed by suitable washing, or otherwise; or, an excess of phenolic body can be employed, the excess of such body being subsequently removed by distillation or otherwise. The reaction may be carried out in the presence of a diluent, as for example water. The temperature during the reaction may be comparatively low or comparatively high, or vary from low to high, or vice-versa.

The proportions of carbohydrate, reactive basic body and phenol can be adjusted so that there may be no necessity for subsequently removing an excess of any of the reactive ingredients. The reaction can be carried out at atmospheric pressure, at super-atmospheric pressure, or at sub-atmospheric pressure. At any stage during the reaction, suitable additional materials may be incorporated, as for example, "lubricants", dyes, pigments, strengthening, supporting or filling materials, solvents, or "plasticizers", oxidizing or reducing agents.

The commercial practice of the invention may involve preparation of resinous products of a reactive or "potentially reactive" character, as for example, products of such a nature that, while under ordinary conditions of temperature they suffer no change or change slowly, when subjected to elevated temperatures become transformed into hard, inert products suitable for adaptation in various applications, as for example, in the production of molded articles, useful in the electrical and other arts and industries.

It may be desirable, therefore, to prepare resinous products which while capable of fusion or softening at comparatively low temperatures are nevertheless capable of hardening or becoming infusible at higher temperatures, or upon being subjected to a comparatively low temperature for a considerable period of time. The fusible or workable character of such products facilitates their incorporation with other bodies e. g., wood fibre and other substances.

In general, the larger the proportion of the phenolic body employed with respect to the reactive basic body and carbohydrate, the less is the tendency of the resulting product to become infusible, and conversely. By a suitable adjustment of the proportions of reacting ingredients a substance may be prepared which while capable of softening at temperatures, for example, in the neighborhood of 100 degress C., may become hardened or infusible upon exposure to higher temperatures; or a substance may be prepared of such a character that high temperatures will not produce hardening or infusibility. Such a substance may, however, be mixed with hardening agents at comparatively low temperatures, and while at these low temperatures final hardening may not take place, upon exposure to higher temperatures such a mixture may undergo rapid hardening.

It may, therefore, be desirable to utilize such products in two stages, the first stage representing the product in comparatively soft or unfinished condition and the second stage corresponding to a harder or more completed form.

This is particularly true in the molding industry inasmuch as the production of molded articles requires a substance which at comparatively low temperatures will, under compression, soften and conform accurately to the volume and shape of the mold, i. e., "flow", and which will, nevertheless, rapidly harden "in situ" and produce a hard, inert, technically useful product.

Furthermore, the incorporation with the resinous substance of hardening, straightening, wear-resisting, toughening, abrasive, or filling material, etc., renders desirable a resious substance of a (at least temporarily) comparatively soft, fusible or soluble character. As is well known in the art, resinous substances are generally mixed with other ingredients in one of two ways, first by softening the resinous substance by heat or otherwise and simultaneously incorporating such other substance therewith, mechanically, as for example on differential rolls; and secondly, by dissolving such resinous substance in a solvent, mixing such solution with the body to be incorporated therewith and subsequently evaporating the solvent.

*Examples*

10. Corn sugar, paraphenylenediamine and phenol:

| | Parts by weight |
|---|---|
| Corn sugar | 180 |
| Phenol | 80 |
| Water | 100 |
| Oxalic acid | 4 |
| Paraphenylenediamine | 20 |

The above ingredients were heated under reflux for three hours, washed with hot water and dehydrated. The product was soft and fusible at low temperatures. 210 parts by weight were mixed with 70 parts by weight of wood flour on differential rolls at about 100 degrees C. and the resulting mixture molded or cured for 10 minutes in a steel mold at 120 lbs. steam pressure and 2000 lbs. hydraulic compressive pressure. The product was heat resistant, i. e., infusible, and hard.

11. Corn sugar, beta-naphthol and aniline:

| | Parts by weight |
|---|---|
| Corn sugar | 210 |
| Beta-naphthol | 44 |
| Water | 50 |
| Aniline | 50 |

The above ingredients were heated under reflux for seven hours. The reaction products were washed with water and dehydrated. 200 parts by weight of resinous product were obtained, dark red in color, hard and brittle. This product did not become infusible upon heating to 150 degrees centigrade.

12. Corn sugar, alpha-naphthylamine and beta-naphthol:

| | Parts by weight |
|---|---|
| Corn sugar | 420 |
| Alpha-naphthylamine | 50 |
| Beta-naphthol | 200 |
| Water | 100 |

These ingredients were heated under reflux for twelve hours. The resulting resinous substance was washed with water and dehydrated and was permanently fusible.

13. Corn sugar, cresylic acid and aniline:

| | Parts by weight |
|---|---|
| Corn sugar | 420 |
| Cresylic acid | 200 |
| Aniline | 100 |
| Water | 100 |

These ingredients were refluxed eight hours, washed with hot water and dehydrated. The yield of resinous product was 420 parts by weight. This was mixed on hot differential rolls with 400 parts by weight of wood flour. The resulting product was placed in a steel mold and subjected to a hydraulic pressure of 2000 lbs. per square inch, and a temperature corresponding to 120 lbs. of steam for five minutes. This treatment caused considerable hardening.

14. Starch, pyrogallol and aniline:

| | Parts by weight |
|---|---|
| Starch | 63 |
| Pyrogallol | 40 |
| Aniline | 20 |
| Water | 100 |
| Oxalic acid | 1½ |

These ingredients were heated under reflux for eight hours. The resulting product was washed with hot water. A dark colored resin was precipitated and dehydrated. This product tended to become infusible at temperatures above 150 degrees C.

15. Corn sugar, phenol, aniline and phosphoric acid:

| | Parts by weight |
|---|---|
| Corn sugar | 420 |
| Phenol | 250 |
| Aniline | 50 |
| Ortho-phosphoric acid | 4.3 |

The above ingredients were heated under reflux for seven hours, washed and dehydrated at 120 degrees C.; 400 parts by weight of water-insoluble, soft, resinous, dark-colored material was obtained. On hot differential rolls the product was mixed with a hardening agent consisting of 40 parts by weight of hexamethylenetetramine and strengthening material consisting of 400 parts by weight of ground wood. This mixture was compressed in a steel mold under 2000 lbs. pressure and simultaneously heated to 160 degrees C., and under these conditions yielded an infusible molded article, black in color. The molded material in the shape of a slab was subjected to a dielectric test to determine its value as a dielectric. It was subjected to an alternating current of 1000 cycles frequency, and the "equivalent series resistance" determined. From this value, the so-called "phase angle difference" was calculated and the latter compared with the corresponding value for hard rubber. This value for the resinous product was 1.3° and for hard rubber 0.4°. This value of 1.3° indicates insulating power of a high order. The resinous product prepared as described was also subjected, in the form of a thin slab, to a temperature of 190 degrees F. for three hours. Under these conditions no warping or blistering could be detected.

16. Corn sugar, phenol and aniline:

| | Parts by weight |
|---|---|
| Corn sugar | 420 |
| Phenol | 216 |
| Aniline | 92 |

The above ingredients were heated under reflux for six hours. The resulting product was washed with water and then dehydrated. The yield of resinous product was 500 parts by weight. It was dissolved in a mixture of 360 parts by weight of alcohol and 200 parts by weight of water, and 60 parts by weight of hexamethylenetetramine added. The resulting solution was mixed with 450 parts by weight of ground wood and the resulting mixture was air dried for four hours at 110 degrees to 120 degrees, centigrade. The product was ground to a powder and molded in steel molds, under a compression of 2000 lbs. per square inch, and at a temperature corresponding to 120 lbs. of steam, for periods varying from 3 to 10 minutes. Under these conditions infusibility developed rapidly and a product which possessed good mechanical as well as electric resistance was obtained. The transverse breaking strength of this material, tested in a Riehle machine, on a 6-inch span, was 7400 lbs. per square inch.

17. Corn sugar, paratoluidine and cresylic acid, (cresols).

| | Parts by weight |
|---|---|
| Corn sugar (85% dextrose) | 420 |
| Paratoluidine | 100 |
| Cresylic acid (B. P. 195–205 degrees centigrade) | 200 |
| Water | 100 |

These materials were refluxed together for five hours, and the product washed and dehydated by heating to 120 degrees C. A fusible, soft resinous, dark colored product was obtained.

18. Corn sugar, thiocarbanilide, phenol and oxalic acid:

| | Parts by weight |
|---|---|
| Corn sugar | 360 |
| Thiocarbanilide | 71 |
| Phenol | 150 |
| Oxalic acid | 5 |
| Water | 120 |

These materials were refluxed together for three hours. The product was washed with hot water and dehydrated by heating. A dark red, fusible resinous body was obtained.

19. Corn sugar, aniline, guaiacol (wood tar creosote), and phenol (carbolic acid).

A mixture of: corn sugar, 500 parts by weight; wood tar creosote, 80 parts by weight; aniline, 75 parts by weight, and phenol, 320 parts by weight, was subjected to ordinary distillation for three hours, the temperature of the mass rising from 124 to 178 degrees C. 210 parts by weight of aqueous distillate were collected. The distillation residue was, on cooling, a tough, hard, black resin, possessing the ability to become infusible on heating with suitable condensing agents, as for example, anhydro-formaldehyde aniline.

The following example will present a further specific illustration of a method for practicing the present invention in its preferred form in such a manner that the time involved in preparing the desired product is comparatively short.

20. A mixture of:

| | Parts by weight |
|---|---|
| Phenol | 350 |
| Beta-naphthol | 50 |
| Aniline | 75 | was heated to 120 degrees C. and to this mixture 500 parts by weight of "Argo" corn sugar were gradually added and heating continued until the sugar dissolved. At 122 degrees C., the mixture boiled, that is, water was evolved. Alternate distillation and refluxing was employed during a period of five hours. During the distillation periods the temperature rose respectively to 150 degrees C., 170 degrees C. and 172 degrees C., and during these distillation periods 209 parts by weight of aqueous distillate was collected, consisting for the most part of water and containing somewhat less than 1% of volatile, reducing acids, calculated as formic acid. Approximately 4 parts by weight of carbon dioxide were evolved during the reaction. The adjustment of proportions as above specified provided a resinous residue substantially insoluble in water. On cooling, this residue was a hard, resinous mass, dark red in color. This product became infusible upon heating with a small proportion of various hardening agents, particularly those comprising a basic body, as for example, furfuramide, hexamethylenetetramine, paraphenylenediamine, anhydro-formaldehyde-aniline. The resinous body prepared as described was mixed with an equal weight of wood flour and 5% of hexamethylenetetramine on heated differential rolls. The product "cured", that is, became rigid, when heated about 4 minutes at 170 degrees C. in steel molds, under a compression of 2000 lbs. per square inch, and under these conditions the molded article was capable of removal from the mold without the necessity of cooling the latter, i. e., the molded article was decidedly heat resistant, or "infusible."

In the preferred form of the present invention, cellulose and cellulosic materials can be employed to effect hardening of comparatively soft or fusible reaction products, as for example, by heating such products with "wood flour" or other suitable cellulosic or similar material.

As above stated, the fusibility of products prepared according to the methods of the preferred form of the invention depends, in part at least, on the proportion of carbohydrate to phenol (and vice versa); the larger the proportion of carbohydrate to phenol, the more being the tendency of the resulting product to become infusible. This knowledge can be utilized in preparing fusible and infusible products, by dividing the total carbohydrate material into two portions. One of the portions can be reacted with the phenol to produce a comparatively soft or fusible body and the latter can then be incorporated with the remainder of the carbohydrate to produce a reactive material which on further heating will harden or become infusible.

In the preferred form of the present invention, the first portion of carbohydrate material is preferably a water soluble carbohydrate, i. e., a sugar, dextrin, or a starch, and the other portion is preferably a water insoluble carbohydrate, i. e., a cellulose or cellulosic body, as for example, wood flour. In the second stage, an excess of cellulosic material, over that necessary to cause hardening, may be used, the excess acting as filling or mechanical supporting material.

*Example 21*

200 parts by weight of cresylic acid (boiling range 195 to 210 degrees C.) and 100 parts by weight of aniline, were heated with 420 parts by weight of crude dextrose ("Argo" corn sugar) under reflux, with 100 parts by weight of water, to the point of ebullition, and refluxing was continued for eight hours. The reaction products were settled and the lower layer of resinous material drawn off and dehydrated by heating to 130 degrees C. This was dark colored and at room temperature was soft to the touch, somewhat resembling a soft asphalt or coal tar residuum in consistency. 200 parts by weight were mixed on hot differential rolls with 140 parts of ground wood and 50 parts of cotton linters and the resulting product cooled and ground. It was then placed in a mold and the latter heated to about 170 degrees C. under hydraulic pressure. The resulting molded product was infusible and hard and possessed a transverse breaking strength of 5000 pounds per square inch.

This demonstrates the hardening action of an insoluble carbohydrate material on the fusible reaction products of a soluble carbohydrate, a reactive base and a phenol.

In such a procedure the use of the basic body may be deferred until the second or final hardening stage. That is, a fusible or soft resinous body can be prepared by reacting a carbohydrate with a phenol as shown in Example 22, and the product hardened by the simultaneous action of an additional quantity of carbohydrate (as for example, in the form of wood flour) and an agent comprising a suitable basic body, e. g., anhydroformaldehyde aniline. In other words, the invention can be practiced in its preferred form by heating the resinous reaction product of a carbohydrate and a phenol with cellulose and a substance comprising a suitable basic body.

With respect to the action of hardening agents comprising a suitable basic body on resinous bodies produced by the methods of the present invention, there seems to be a parallel between such agents and those substances which accelerate the vulcanization of rubber. As is well known, paraphenylenediamine, hexamethylenetetramine, anhydroformaldehyde aniline and other bodies comprising a suitable basic substance have a marked effect in accelerating the vulcanizing action of sulphur on rubber; and such bodies also can be used to harden resinous substances made by the methods of the present invention.

As further regards the use of basic or nitrogenous or alkaline bodies, or suitable derivatives thereof, in conjunction with carbohydrates and phenols, such basic bodies or suitable derivatives thereof may be employed at any suitable stage of the reaction. For example, such basic or nitrogenous bodies may be omitted in the first reaction stage and subsequently employed as hardening agents. This is true of aniline and suitable derivatives thereof, as for example, suitable condensation products of aniline and reactive aldehydes, e. g., anhydro-formaldehyde-aniline. A resinous body can be prepared from a carbohydrate and a phenol with or without the use of a basic or nitrogenous body, as for example, by reacting sucrose or other suitable carbohydrate with a phenol in the presence of a small proportion of mineral acid, or otherwise, as for example, by methods described in my previous applications, Serial Nos. 517,721 and 575,648. With such resinous body a hardening agent comprising a reactive base or suitable derivative thereof, can be incorporated, as for example, anhydro-formaldehyde-aniline, and the whole heated with or without other material to effect further reaction and hardening of the mass.

*Example 22*

300 parts by weight of sucrose (cane sugar) were heated for eight hours under reflux with 130 parts by weight of phenol, 100 parts by weight of water, 10 parts by weight of oxalic acid, and 15 parts by weight of sodium chloride. The resinous and aqueous reaction products were separated by gravity in a separatory vessel, the former washed with hot water and then dehydrated by heating to 120 degrees centigrade. 200 parts by weight of resinous body were obtained. This was soft to the touch, and fusible. It was incorporated with ten per cent. by weight of anhydroformaldehydeaniline and the product heated to 160 degrees centigrade, whereupon an infusible, resinous product was obtained.

The present invention provides means for preparing molded and other articles possessing high insulating value. As is well known to those skilled in the art, the dielectric value of insulating materials may be measured by using the same as a dielectric with a current of 1000 cycles frequency, measuring the "equivalent series resistance" and then calculating the "phase angle difference", which is an inverse measure of the dissipation of energy in the dielectric material. For the ideal insulating material, the "phase angle difference" should be zero. Freshly prepared, good hard rubber has a very small "phase angle difference", e. g., 0.3 to 0.4 degrees. Materials prepared according to the methods of the present invention may have a "phase angle difference" as low as 1.0 degree. This may indicate that such materials have a molecular structure somewhat akin to the rubber molecule and this view is strengthened by the hardening action of certain agents which accelerate the vulcanization of rubber.

What I claim is:—

1. The process of producing a chemical product adapted for use as resinous material which comprises reacting a carbohydrate with a reactive nitrogenous basic body in the presence of acidic material and thereafter incorporating a hardening agent.

2. The process of making a chemical product adapted for use as resinous or insulating material, which comprises reacting a carbohydrate with a reactive nitrogenous basic body in the presence of acidic material and thereafter incorporating a hardening agent.

3. The process of producing a plastic resinous material capable of being hardened which comprises reacting a carbohydrate with a reactive nitrogenous substance and an inorganic acid.

4. The process of producing a plastic resinous material capable of being hardened which comprises reacting a carbohydrate with a reactive nitrogenous substance and hydrochloric acid.

5. The process which comprises reacting a carbohydrate with a reactive nitrogenous substance and an inorganic acid to produce plastic material and subsequently heating the same with a hardening agent.

6. The process which comprises reacting dextrose with a reactive nitrogenous substance and an inorganic acid to produce plastic material and subsequently heating the same with a hardening agent.

7. The process of producing a plastic resinous material capable of being hardened which comprises reacting a carbohydrate with aniline and an inorganic acid.

8. The process of producing a plastic resinous material capable of being hardened which comprises reacting a carbohydrate with aniline and hydrochloric acid.

9. The process of producing a plastic resinous material capable of being hardened which comprises reacting a carbohydrate with an aromatic primary amine and an inorganic acid.

10. The process which comprises reacting a carbohydrate with an aromatic primary amine and an inorganic acid to produce plastic material and subsequently heating the said plastic material to harden it.

11. The process which comprises reacting a carbohydrate with an aromatic primary amine and an inorganic acid to produce plastic material and subsequently heating the same with a hardening agent to harden it.

12. The process which comprises reacting a carbohydrate with a reactive nitrogenous substance and an inorganic acid to produce plastic material and subsequently heating the same to harden it.

13. The process which comprises reacting dextrose with aniline and an inorganic acid to produce a product adapted for use as plastic material.

14. The process which comprises reacting dextrose with aniline and hydrochloric acid to produce a product adapted for use as plastic material.

15. The process which comprises decomposing a carbohydrate by heating it with an acid and a reactive nitrogenous base to produce a product adapted for use as plastic material.

16. The process of making a resinous material capable of being hardened which comprises reacting a carbohydrate with a reactive nitrogenous substance in the presence of acidic material at temperatures above 100 degrees centigrade.

17. The process which comprises reacting a carbohydrate with a reactive nitrogenous substance to produce resinous material and heating said resinous material to temperatures above 100 degrees centigrade to harden it.

JOSEPH V. MEIGS.